United States Patent
Park et al.

(10) Patent No.: US 11,387,509 B2
(45) Date of Patent: Jul. 12, 2022

(54) SECONDARY BATTERY INCLUDING INSULATION MEMBER HAVING MULTIPLE THICKNESSES

(71) Applicant: Samsung SDI Co., Ltd., Yongin-si (KR)

(72) Inventors: Seunghee Park, Yongin-si (KR); Jeawoan Lee, Yongin-si (KR); Youngchang Lim, Yongin-si (KR); Euysun Jung, Yongin-si (KR); Soomi Eo, Yongin-si (KR); Kyunghoon Cho, Yongin-si (KR); Kyung Kim, Yongin-si (KR); Kwonchul Kim, Yongin-si (KR); Jaemin Im, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 740 days.

(21) Appl. No.: 15/354,874

(22) Filed: Nov. 17, 2016

(65) Prior Publication Data

US 2017/0149024 A1 May 25, 2017

(30) Foreign Application Priority Data

Nov. 19, 2015 (KR) .................. 10-2015-0162836

(51) Int. Cl.
*H01M 2/02* (2006.01)
*H01M 2/06* (2006.01)
(Continued)

(52) U.S. Cl.
CPC ..... *H01M 50/116* (2021.01); *H01M 10/0413* (2013.01); *H01M 50/10* (2021.01);
(Continued)

(58) Field of Classification Search
None
See application file for complete search history.

(56) References Cited

U.S. PATENT DOCUMENTS 6,632,538 B1 * 10/2003 Yamazaki ............. H01M 2/021
428/213
2008/0083113 A1 4/2008 Hong
(Continued)

FOREIGN PATENT DOCUMENTS

JP 2011181300 A * 9/2011
KR 10-2002-0039097 A 5/2002
(Continued)

OTHER PUBLICATIONS

Natta et al.,"Dependence of the Melting point of Isotactic Polypropylenes on their Molecular Weight and Degree of Stereospecificity of Different Catalytic Systems",From the Istituto di Chimica Industriale del Politecnico, Milano, and Centro Nazionale di Chimica delle Macromolecole del C.N.R.,Milano,Italy,p. 191-205.*

*Primary Examiner* — Zhongqing Wei
(74) *Attorney, Agent, or Firm* — Knobbe, Martens, Olson & Bear, LLP (57) ABSTRACT

A secondary battery is disclosed. In one aspect, the secondary battery includes an electrode assembly, a case accommodating the electrode assembly and a lead member extending from the electrode assembly to outside of the case. The secondary battery also includes an insulation member at least partially covering the lead member, the insulation member having an exterior portion that is located outside the case and an interior portion that is located inside the case, wherein the interior portion has a first thickness, and wherein at least part of the exterior portion has a second thickness less than the first thickness. The secondary battery may have a compact structure, and insulation characteristics of the secondary battery may be improved.

19 Claims, 7 Drawing Sheets

(51) Int. Cl.
    *H01M 2/30* (2006.01)
    *H01M 10/04* (2006.01)
    *H01M 50/116* (2021.01)
    *H01M 50/10* (2021.01)
    *H01M 50/172* (2021.01)
    *H01M 50/531* (2021.01)
    *H01M 50/543* (2021.01)

(52) U.S. Cl.
    CPC ....... *H01M 50/172* (2021.01); *H01M 50/531* (2021.01); *H01M 50/543* (2021.01); *H01M 10/0431* (2013.01); *H01M 2220/20* (2013.01); *H01M 2220/30* (2013.01)

(56) References Cited

U.S. PATENT DOCUMENTS

| | | | |
|---|---|---|---|
| 2010/0047687 A1* | 2/2010 | Lee | H01M 2/0212 429/185 |
| 2013/0230766 A1* | 9/2013 | Ahn | H01M 2/06 429/179 |

FOREIGN PATENT DOCUMENTS

| | | |
|---|---|---|
| KR | 10-2003-0095519 A | 12/2003 |
| KR | 10-2013-0100626 A | 9/2013 |
| WO | WO 02/41437 A1 | 5/2002 |

\* cited by examiner

SECONDARY BATTERY INCLUDING INSULATION MEMBER HAVING MULTIPLE THICKNESSES

CROSS-REFERENCE TO RELATED APPLICATION

This application claims the benefit of Korean Patent Application No. 10-2015-0162836, filed on Nov. 19, 2015, in the Korean Intellectual Property Office, the disclosure of which is incorporated herein in its entirety by reference.

BACKGROUND

Field

The described technology generally relate to a secondary battery.

Description of the Related Technology

The use of secondary batteries as power sources has markedly increased along with the advance in technology for mobile devices such as cellular phones or laptop computers and the increased production of mobile devices. Much research has recently been conducted into developing secondary batteries for use in electric vehicles or hybrid vehicles as substitutes for fossil fuels.

Recently, there is increasing demand for compact secondary batteries for use in small electronic devices. However, the insulation characteristics of compact secondary batteries directly related to safety may be poor.

SUMMARY OF CERTAIN INVENTIVE ASPECTS

One inventive aspect relates to a secondary battery having a compact structure and improved insulation characteristics.

Another aspect is a secondary battery that includes: an electrode assembly; a case accommodating the electrode assembly; a lead member extending from the electrode assembly to outside of the case; and an insulation member covering the lead member, the insulation member having a relatively thin thickness in a main region of a region outside the case and a relatively thick thickness in a main region of a region inside the case.

The insulation member may include a first portion disposed on the lead member and a second portion disposed on the first portion, the first portion may extend to the outside of the case and may form an outer end, and the second portion may have a relatively short length and may not extend to the outer end of the first portion.

The second portion may be thicker than the first portion.

The second portion may be wider than the first portion.

The first portion may be wider than the lead member.

The first and second portions may include substantially the same insulative material.

The first and second portions may be provided in one piece.

The second portion may extend to an inner end of the first portion located inside the case.

The second portion may extend at least to a terrace of the case through which the lead member extends outward.

The insulation member may have a relatively narrow width in the main region of the region outside the case and a relatively wide width in the main region of the region inside the case.

The lead member may extend to the outside of the case through a terrace of the case, and the lead member extending to the outside of the case may be bent back toward the terrace.

The secondary battery may further include a circuit board electrically connected to the lead member and placed on the terrace.

The circuit board may be disposed in parallel with the terrace.

The case may include a flexible pouch.

Another aspect is a secondary battery comprising: an electrode assembly; a case accommodating the electrode assembly; a lead member extending from the electrode assembly to outside of the case; and an insulation member at least partially covering the lead member, the insulation member having an exterior portion that is located outside the case and an interior portion that is located inside the case, wherein the interior portion has a first thickness, and wherein at least part of the exterior portion has a second thickness less than the first thickness.

In the above secondary battery, each of the interior and exterior portions of the insulation member comprises a first portion disposed on the lead member and a second portion disposed on the first portion, wherein the first portion is exposed from the second portion and forms an outer end, wherein the second portion does not extend to the outer end of the first portion, and wherein the second portion is shorter than the first portion.

In the above secondary battery, the second portion is thicker than the first portion. In the above secondary battery, the second portion is wider than the first portion. In the above secondary battery, the first portion is wider than the lead member. In the above secondary battery, the first and second portions comprise substantially the same insulative material. In the above secondary battery, the first and second portions are integrally formed into a single piece. In the above secondary battery, the second portion extends to an inner end of the first portion located inside the case.

In the above secondary battery, the second portion extends at least to a terrace of the case through which the lead member extends outward. In the above secondary battery, the interior portion has a first width, wherein at least part of the exterior portion has a second width less than the first width. In the above secondary battery, the lead member extends to the outside of the case through a terrace of the case, and wherein the lead member extending to the outside of the case is bent back toward the terrace. The above secondary battery further comprises a circuit board electrically connected to the lead member and placed on the terrace. In the above secondary battery, the circuit board is disposed in parallel with the terrace. In the above secondary battery, the case comprises a flexible pouch.

Another aspect is a secondary battery comprising: an electrode assembly; a case accommodating the electrode assembly; a lead member outwardly extending from the electrode assembly to outside of the case; and an insulation member at least partially covering the lead member and having varying thicknesses.

In the above secondary battery, the insulation member has an exterior portion that is located outside the case and an interior portion that is located inside the case, wherein the interior portion has a first thickness, and wherein at least part of the exterior portion has a second thickness less than the first thickness. In the above secondary battery, the interior portion has a first width, and wherein at least part of the exterior portion has a second width less than the first width. In the above secondary battery, the exterior portion has a first exterior portion extending from the interior portion and a second exterior portion extending from the first interior portion, and wherein the first exterior portion has the first thickness, and wherein the second exterior portion has the second thickness.

Another aspect is a secondary battery comprising: an electrode assembly; a case accommodating the electrode assembly; a lead member outwardly extending from the electrode assembly to outside of the case; and an insulation member at least partially covering the lead member and having a stepped structure.

In the above secondary battery, the insulation member has an exterior portion that is located outside the case and an interior portion that is located inside the case, wherein the interior portion has a first thickness, and wherein at least part of the exterior portion has a second thickness less than the first thickness.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed. In this disclosure, the term "substantially" includes the meanings of completely, almost completely or to any significant degree under some applications and in accordance with those skilled in the art. Moreover, "formed, disposed over positioned over" can also mean "formed, disposed or positioned on." The term "connected" includes an electrical connection.

Embodiments will now be described with reference to the accompanying drawings.

Figure 1:
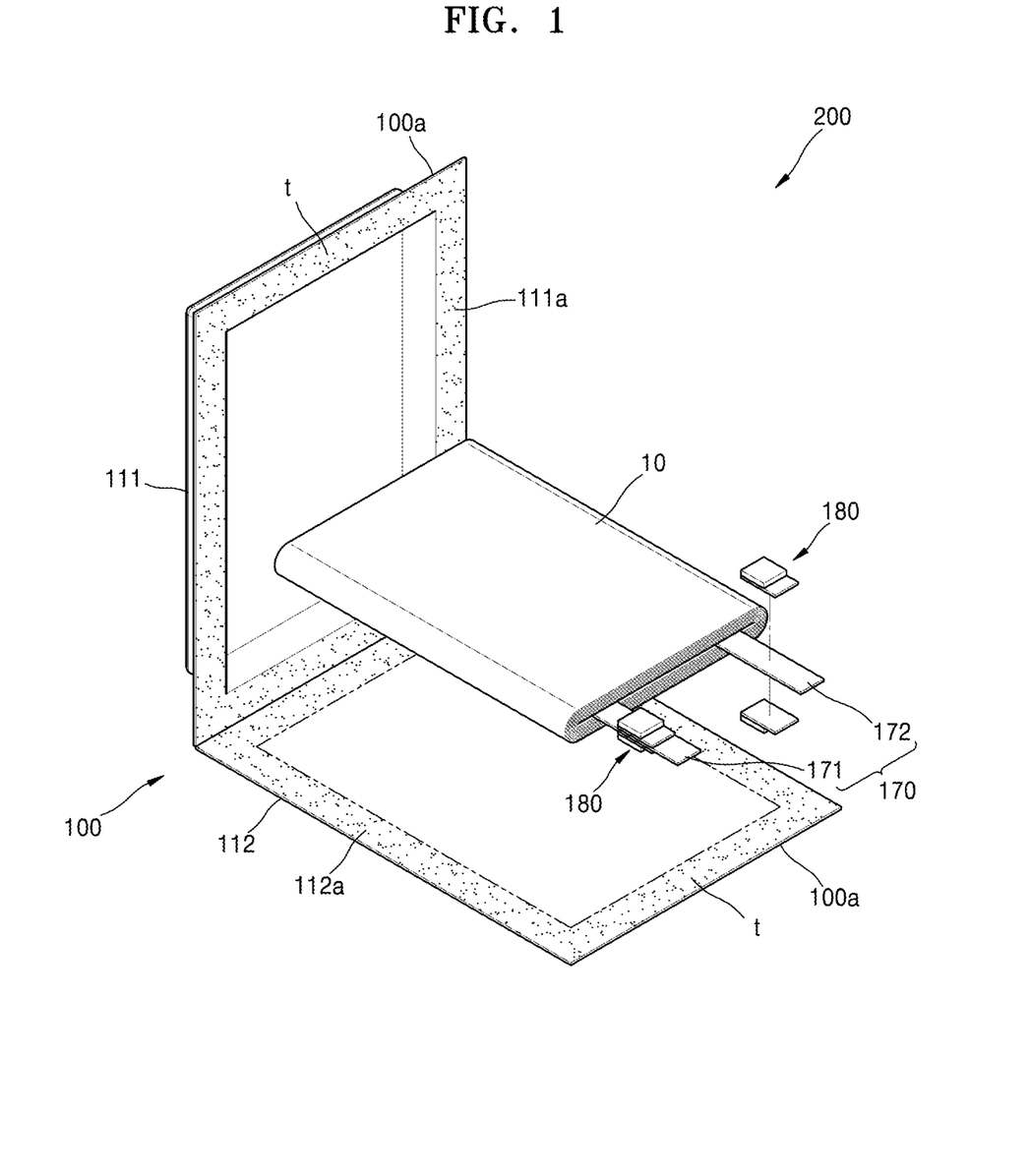
FIG. 1 is an exploded perspective view illustrating a secondary battery according to an exemplary embodiment.
Figure 2:
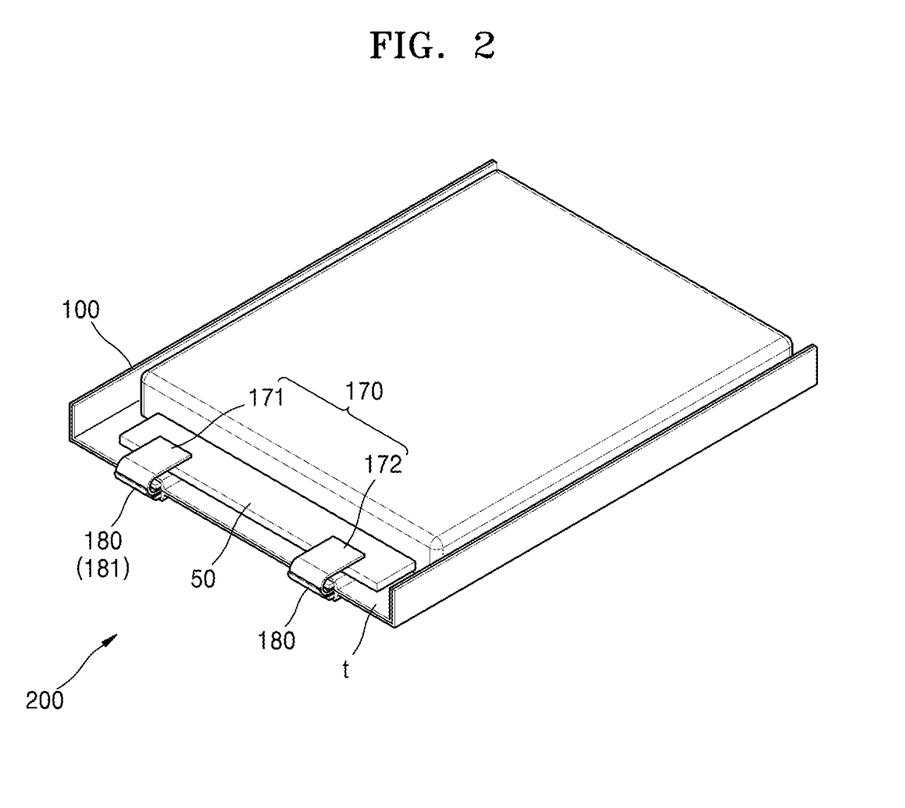
FIG. 2 is a view illustrating a circuit board attached to the secondary battery depicted in FIG. 1.
Figure 3:
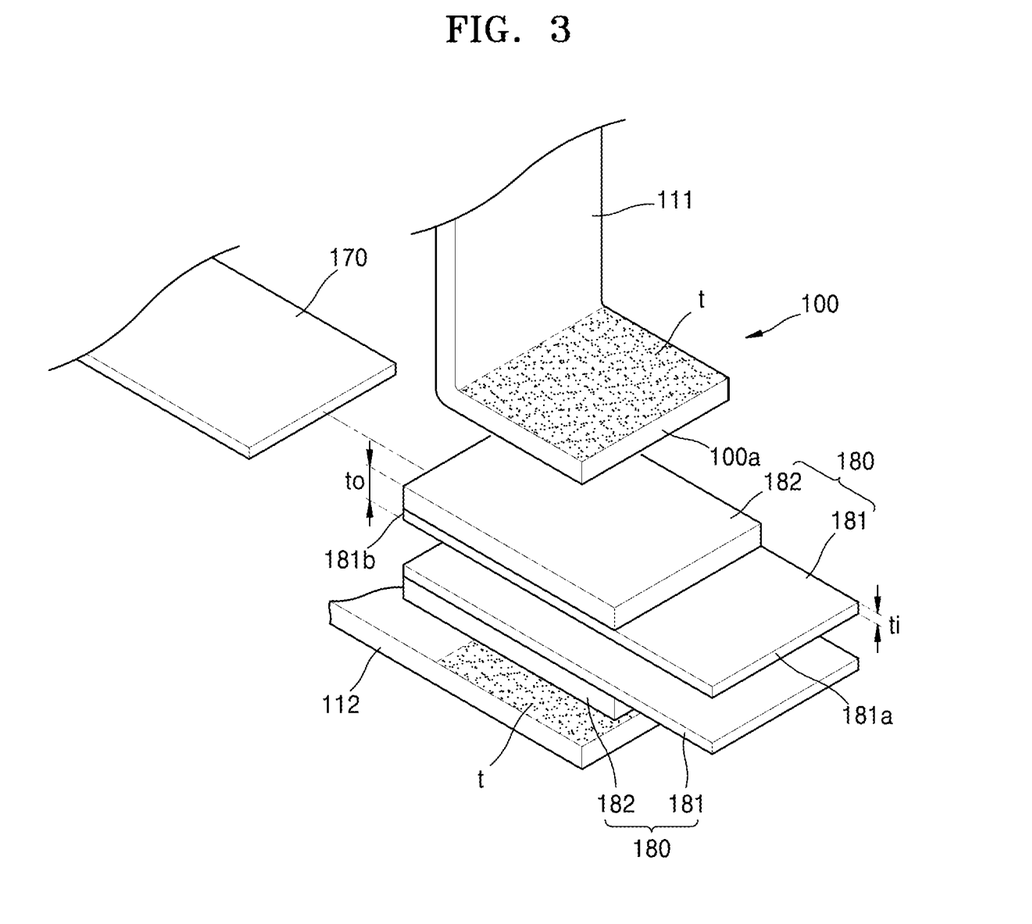
FIGS. 3 to 5 are views illustrating insulation members depicted in FIG. 1.
Figure 4:
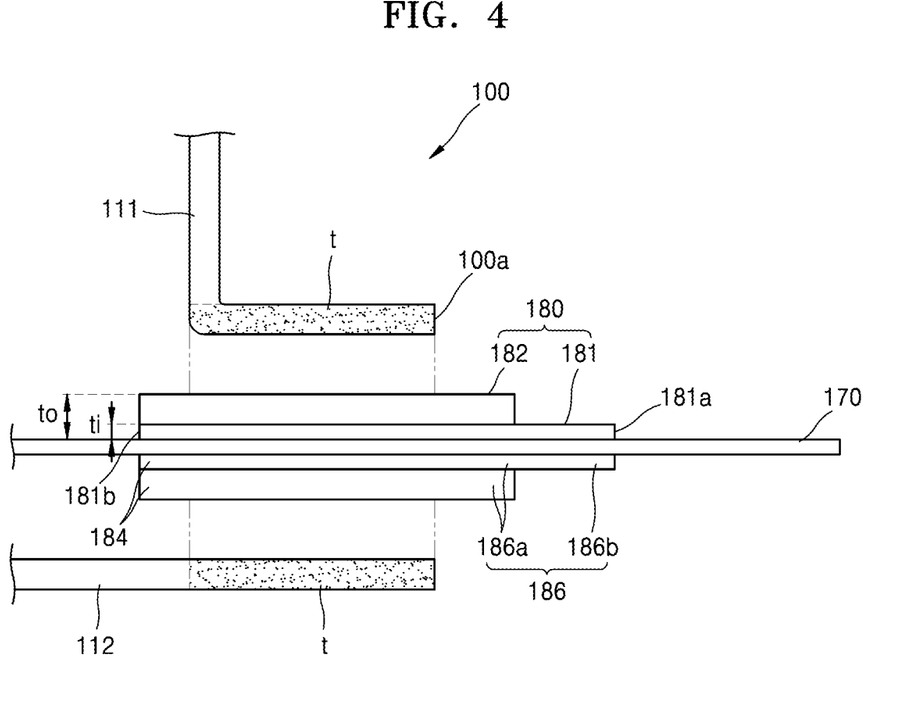
Figure 5:
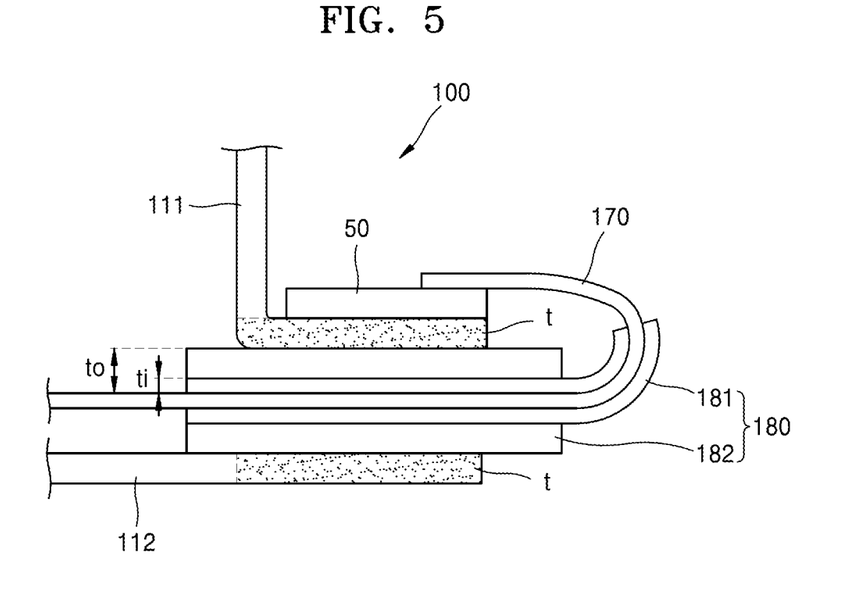

FIG. 1 is an exploded perspective view illustrating a secondary battery 200 according to an exemplary embodiment. FIG. 2 is a view illustrating a circuit board 50 attached to the secondary battery 200 depicted in FIG. 1. FIGS. 3 to 5 are views illustrating insulation members 180 depicted in FIG. 1.

Referring to FIG. 1, the secondary battery 200 includes an electrode assembly 10, a case 100 accommodating the electrode assembly 10 and lead members 170 extending from the electrode assembly 10 to the outside of the case 100.

The electrode assembly 10 may include first and second electrode plates having different polarities and a separator disposed between the first and second electrode plates. For example, the electrode assembly 10 is formed by disposing the separator between the first and second electrode plates and winding the first and second electrode plates and the separator in the form of a jelly-roll. In another exemplary embodiment, however, the electrode assembly 10 is formed as a stacked-type electrode assembly by stacking the first and second electrode plates with the separator being disposed therebetween.

The case 100 may accommodate the electrode assembly 10. For example, the case 100 includes a first case 111 and a second case 112. The first and second cases 111 and 112 may be jointed together in mutually facing directions with the electrode assembly 10 being disposed therebetween. Sealing portions 111a and 112a may be formed along mutually-facing edges of the first and second cases 111 and 112. For example, the first and second cases 111 and 112 accommodate the electrode assembly 10 and may then be joined together in mutually facing directions. The sealing portions 111a and 112a of the first and second cases 111 and 112 may be thermally bonded so as to seal the electrode assembly 10 accommodated in the first and second cases 111 and 112. The lead members 170 may extend to the outside of the case 100 through a terrace (t) formed by the sealing portions 111a and 112a.

The case 100 may be a flexible pouch. Although not shown in FIG. 1, the case 100 may be a flexible case formed of a thin metal sheet coated with an insulative material on both sides. That is, the case 100 may be a pouch-type case configured to hermetically accommodate the electrode assembly 10.

The lead members 170 may extend from the electrode assembly 10. For example, the lead members 170 include first and second lead members 171 and 172 electrically connected to the first and second electrode plates. The lead members 170 may extend to the outside of the case 100 to form a charge-discharge current path. The insulation members 180 may be disposed on the lead members 170. For example, the insulation members 180 are disposed on the lead members 170 at positions facing the case 100 so as to insulate the lead members 170 from the case 100 and seal gaps between the case 100 and the lead members 170.

Referring to FIG. 2, the secondary battery 200 may further include the circuit board 50 electrically connected to the lead members 170. The circuit board 50 may control charge and discharge operations of the secondary battery and may be placed on the terrace (t) of the case 100. Since the circuit board 50 is placed on the terrace (t) of the case 100, a space above the terrace (t) may be efficiently used, and thus the secondary battery 200 may have a compact structure.

Referring to FIGS. 3 and 4, the insulation members 180 surround the lead members 170. Each of the insulation members 180 may have a stepped structure with a relatively thin thickness (ti) and a relatively thick thickness (to) in the length direction of the lead members 170. For example, each of the insulation members 180 includes a first portion 181 having a relatively thin thickness (ti) in a region outside the case 100 and a second portion 182 having a relatively thick thickness (to) in a region inside the case 100. Here, the thickness (ti) is less than the thickness (to). Each of the insulation members 180 may have an interior portion 184 located inside the case 100 and an exterior portion 186 located outside the case 100. Herein, the inside of the case 100 may refer to a region located within edges 100*a* of the case 100. The exterior portion 186 may have a first exterior portion 186*a* directly extending from the interior portion 184 and a second exterior portion 186*b* extending from the first exterior portion 186*a*. Each of the interior portion 184 and the first exterior portion 186*a* may have the thick thickness (to). The second exterior portion 186*b* may have the thin thickness (ti). Although not shown on the drawings, the interior portion may have the thick thickness (to) and the entirety of the exterior portion may have the thin thickness (ti).

The insulation members 180 may be relatively thick in regions located inside the case 100 so as to sufficiently insulate the lead members 170 from the case 100, and may be relatively thin in regions outside the case 100 so as to allow for free deformation of the lead members 170.

As described later, the thin thickness (ti) may refer to the thickness of the first portion 181 of each of the insulation members 180, and the thick thickness (to) may refer to the sum of the thicknesses of the first and second portions 181 and 182 of each of the insulation members 180.

The first portion 181 is disposed on the lead member 170, and the second portion 182 is disposed on the first portion 181. The first and second portions 181 and 182 overlap each other in the length direction of the lead member 170, and the first portion 181 may be longer than the second portion 182. For example, the first portion 181 extends to the outside of the case 100. Outside the case 100, the first portion 181 may not be covered with the second portion 182 and may be exposed.

The insulation members 180 may extend from the inside to the outside of the case 100 in the length direction of the lead members 170. The first portions 181 of the insulation members 180 may extend from the inside to the outside of the case 100 and may be relatively long in a direction from the inside to the outside of the case 100. The first portions 181 may extend to the outside of the case 100, and outside of the case 100, the first portions 181 may not be covered with the second portions 182 and may be exposed.

The second portions 182 of the insulation members 180 may be formed on the first portions 181 of the insulation members 180 and may be shorter than the first portions 181 in the length direction of the lead members 170. For example, the second portions 182 may be mainly placed inside the case 100 but not placed outside the case 100.

The second portions 182 may be relatively short and may not extend to outer ends 181*a* of the first portions 181. In other words, outside the case 100, the second portions 182 do not cover the outer ends 181*a* of the first portions 181, and thus the first portions 181 may be partially exposed. In the exemplary embodiment, the second portions 182 insulate the lead members 170 from the case 100. Thus, the second portions 182 may extend at least through the terrace (t) of the case 100 in which the lead members 170 face the case 100. The second portions 182 may extend from the terrace (t) of the case 100 to the outside of the case 100 to provide margin for error. However, outside the case 100, the second portions 182 may not completely cover the first portions 181. That is, outside the case 100, the second portions 182 may be shorter than the first portions 181 and may thus not reach the outer ends 181*a* of the first portions 181.

For example, the second portions 182 and the first portions 181 insulate the lead members 170 from the case 100, and the sum of the thicknesses of the second portions 182 and the first portions 181 (that is, the thick thickness (to) of the insulation members 180) may guarantee sufficient insulation between the case 100 and the lead members 170. Therefore, the second portions 182 are mainly located in an inner region of the case 100 in which the lead members 170 may physically interfere with the case 100. The second portions 182 may extend to inner ends 181*b* of the first portions 181 so as to guarantee sufficient insulation together with the first portions 181. In other words, the first portions 181 extend from the inside to the outside of the case 100 with the inner ends 181*b* of the first portions 181 being located inside the case 100 and the outer ends 181*a* of the first portions 181 being located outside the case 100. Furthermore, the second portions 182 extend to the inner ends 181*b* of the first portions 181 but do not extend to the outer ends 181*a* of the first portions 181.

As shown in FIGS. 3 and 4, the insulation members 180 may be substantially symmetrical with the lead members 170 being disposed therebetween. In addition, the first and second portions 181 and 182 of the insulation members 180 disposed on both sides of the lead members 170 may be substantially symmetrical. For example, the insulation members 180 may be provided in the form of pieces of tape attached to upper and lower sides of the lead members 170. The above-described characteristics of the first and second portions 181 and 182 of the insulation members 180 may be applied to the case in which the first and second portions 181 and 182 of the insulation members 180 are attached to the upper and lower sides of the lead members 170.

Referring to FIG. 5, the lead members 170 may extend to the outside of the case 100 through the terrace (t) of the case 100 and may then be bent back toward the terrace (t) such that the circuit board 50 connected to the lead members 170 may be placed on the terrace (t).

The first portions 181 of the insulation members 180 may extend to the outside of the case 100 and may be bent together with the lead members 170. Outside the case 100, the second portions 182 of the insulation members 180 may not be disposed above the lead members 170 so as not to suppress deformation of the lead members 170. Thus, the lead members 170 may be freely bent in regions outside the case 100. However, even outside the case 100, the first portions 181 of the insulation members 180 may be disposed on the lead members 170 to prevent physical interference between the case 100 and the lead members 170.

That is, inside the case 100, the first and second portions 181 and 182 may be placed on top of another so as to guarantee sufficient insulation between the case 100 and the lead members 170. However, the second portions 182 may not extend to the outside of the case 100 to allow for free bending of the lead members 170, and the first portions 181 may extend to the outside of the case 100 to prevent physical interference between the case 100 and the lead members 170.

The lead members 170 extending to the outside of the case 100 through the terrace (t) of the case 100 may be bent back toward the terrace (t) such that the circuit board 50 electrically connected to the lead members 170 may be placed on the terrace (t). Since the circuit board 50 is placed on the terrace (t), the secondary battery may have a compact structure. That is, since the circuit board 50 is placed in a remaining space above the terrace (t), an additional installation space may not be prepared for the circuit board 50, and thus the secondary battery may have a compact structure. For example, in the exemplary embodiment, the circuit board 50 is laid in substantially parallel with the terrace (t). To this end, the lead members 170 may be bent about 180 degrees.

The lead members 170 have flexibility such that the lead members 170 extending outward through the terrace (t) may be bent back toward the terrace (t). In addition, the thickness of the insulation members 180 surrounding the lead members 170 may be reduced (to the thin thickness (ti)) so as to allow for flexible bending of the lead members 170. For example, in the exemplary embodiment, the second portions 182 are not disposed above the lead members 170 in regions outside the case 100, and thus the thickness of the insulation members 180 may be reduced by the thickness of the second portions 182. Therefore, the lead members 170 may be flexibly deformed in regions outside the case 100 without hindrance by the second portions 182 having a relatively thick thickness.

The insulation members 180 may have a stepped structure in the thickness direction thereof. That is, the insulation members 180 may have a relatively thick thickness (to) in regions in which the first and second portions 181 and 182 overlap each other, and a relatively thin thickness (ti) in regions in which only the first portions 181 are located.

Since the first portions 181 extend to the outside of the case 100, the first portions 181 may have a relatively thin thickness so as not to hinder flexible bending of the lead members 170. The second portions 182 may have a relatively thick thickness so as to guarantee sufficient insulation by supplementing the first portions 181 having a relatively thin thickness.

Figure 6:
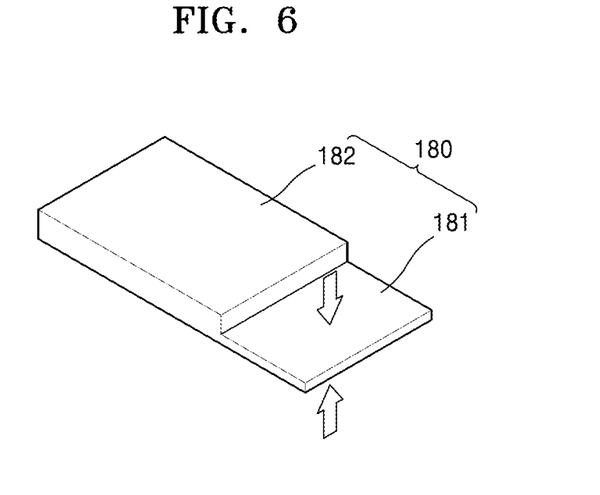
FIG. 6 is a perspective view illustrating an insulation member applicable to the secondary battery according to another exemplary embodiment.

FIG. 6 is a perspective view illustrating an insulation member 180 applicable to the battery according to another exemplary embodiment.

Referring to FIG. 6, the insulation member 180 includes first and second portions 181 and 182 containing substantially the same insulative material. For example, the first and second portions 181 and 182 may be integrally formed into one piece. The insulation member 180 having a one-piece stepped structure in the thickness direction thereof may be formed through a rolling process. That is, a portion of the insulation member 180 may be compressed in a flat shape by applying a high pressure thereto, and thus the insulation member 180 may have a relatively thin thickness in a compressed region and a relatively thick thickness in a non-compressed region.

Figure 7:
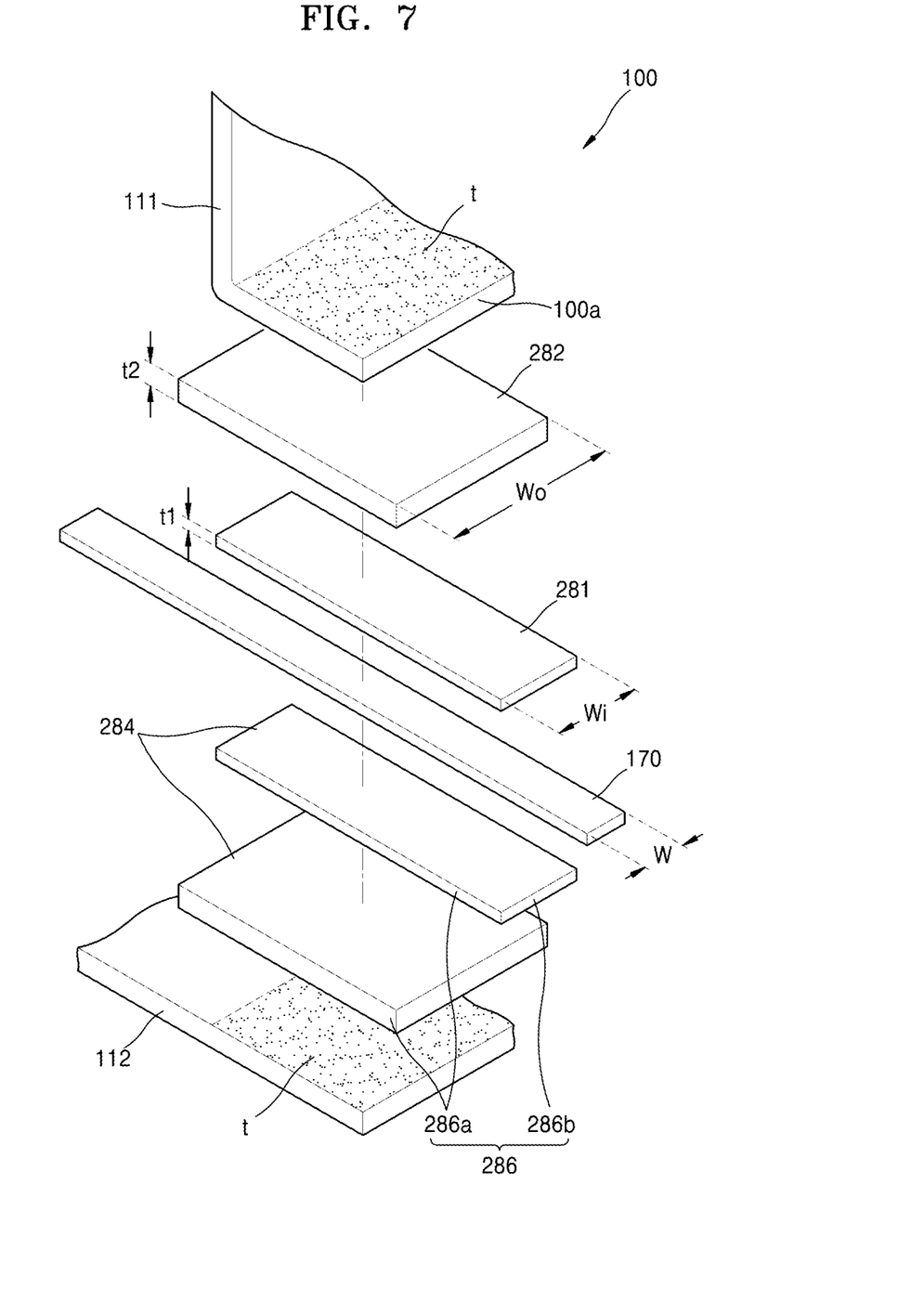
FIG. 7 is a view illustrating installation members according to another exemplary embodiment.
Figure 8:
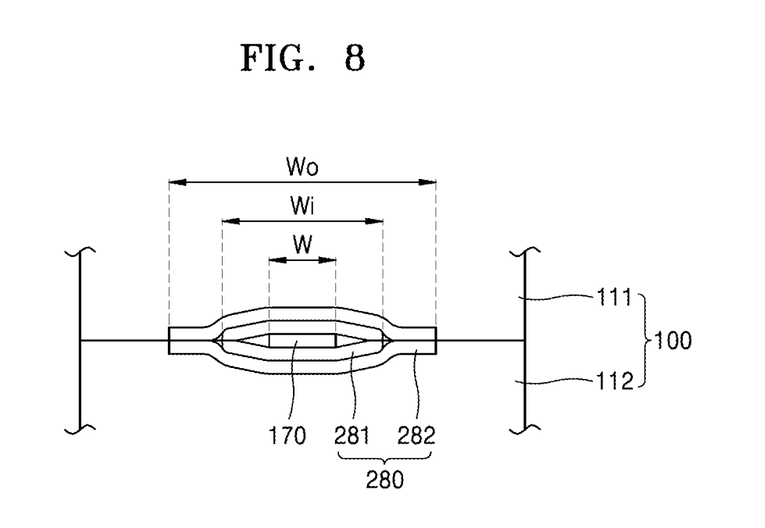
FIG. 8 is a front view illustrating the insulation members depicted in FIG. 7.

FIG. 7 is a view illustrating installation members 280 according to another exemplary embodiment. FIG. 8 is a front view illustrating the insulation members 280 depicted in FIG. 7.

Referring to FIGS. 7 and 8, each of the insulation members 280 may have a stepped structure with a relatively narrow width Wi and a relatively wide width Wo. For example, each of the insulation members 280 includes a first portion having a relatively narrow width Wi in a region outside the case 100 and a second portion having a relatively wide width Wo in a region inside the case 100. Here the width (Wi) is less than the width (Wo). Each of the insulation members 280 may have an interior portion 284 located inside the case 100 and an exterior portion 286 located outside the case 100. The exterior portion 286 may have a first exterior portion 286a directly extending from the interior portion 284 and a second exterior portion 286b extending from the first exterior portion 286a. Each of the interior portion 284 and the first exterior portion 286a may have the wide width Wo. The second exterior portion 286b may have the narrow width Wi. Although not shown on the drawings, the interior portion may have the wide width Wo and the entirety of the exterior portion may have the narrow width Wi.

The insulation members 280 may have a relative wide width Wo in regions located inside the case 100 so as to sufficiently insulate the lead members 170 from the case 100, and may have a relatively narrow width Wi in regions outside the case 100 so as to allow for free deformation of the lead members 170. As described later, the narrow width Wi may refer to the thickness of a first portion 281 of each of the insulation members 280, and the wide width Wo may refer to the width of a second portion 282 of each of the insulation members 280.

The first portions 281 may extend from the inside to the outside of the case 100 and may have a relatively long length greater than that of the second portion 282, and the second portions 282 may be mainly disposed inside the case 100. The second portions 282 may have a relatively short length less than that of the first portion 281 such that the second portions 282 may not reach outer ends of the first portions 281 located outside the case 100.

The first portions 281 may have a relatively thin thickness t1 so as not to hinder bending of the lead members 170, and the second portions 282 may have a relatively thick thickness t2 to insulate the lead members 170. That is, the first and second portions 281 and 282 may have different thicknesses.

In the current exemplary embodiment, the first portions 281 has a relatively narrow width Wi, and the second portions 282 has a relatively wide width Wo. For example, the first portions 281 may have a relatively thin thickness t1 and a relatively narrow width Wi, and the second portions 282 may have a relatively thick thickness t2 and a relatively wide width Wo.

The first portions 281 may have a small volume so as not to hinder bending of the lead members 170, and to this end, the first portions 281 may have a relatively thin thickness t1 and a relatively narrow width Wi. In this case, when the first portions 281 are bent together with the lead members 170, the first portions 281 may have a low degree of resistance to bending.

Since the second portions 282 supplement the first portions 281 to substantially guarantee sufficient insulation between the case 100 and the lead members 170, the second portions 282 may have a relatively thick thickness t2 and a relatively wide width Wo. For example, since the second portions 282 have a relatively wide width Wo, the lead members 170 may be insulated in a large area without failure.

The lead members 170 to which the insulation members 180 are attached may have a minimal width W, and the second portions 282 of the insulation members 280 may have a maximal width Wo. The first portions 281 of the insulation members 280 may be wider than the lead members 170 but narrower than the second portions 282 of the insulation members 280.

Since the lead members 170 are insulated by the insulation members 280 surrounding the lead members 170, the lead members 170 may have a minimal width W smaller than the narrow width Wi of the first portions 281. The second portions 282 may have a maximal width Wo greater than the narrow width Wi of the first portions 281 so as to guarantee insulation of the lead members 170.

In the exemplary embodiment, the insulation members 280 include a pair of insulation members 280 attached to opposite sides of the lead members 170. In this case, the pair of insulation members 280 may have the same structure. The above-described characteristics of the first and second portions 281 and 282 of the insulation members 280 may be applied to the case in which the first and second portions 281 and 282 of the insulation members 280 are attached to upper and lower sides of the lead members 170.

Figure 9:
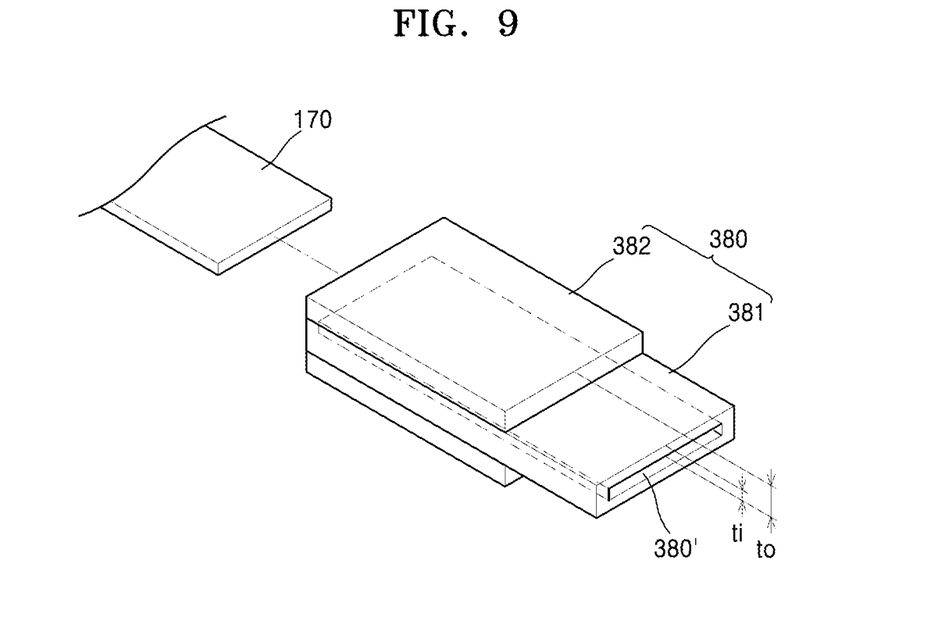
FIG. 9 is a view illustrating an installation member according to another exemplary embodiment.

FIG. 9 is a view illustrating an installation member 380 according to another exemplary embodiment.

The installation member 380 may surround the lead member 170. For example, the installation member 380 may include a channel 380', and the lead member 170 may be inserted into the channel 380' of the installation member 380.

The installation member 380 may include first and second portions 381 and 382 having different thicknesses. For example, the installation member 380 has a relatively thick thickness (to) corresponding to the total thickness of the first and second portions 381 and 382, and a relatively thin thickness (ti) corresponding to the thickness of the first portion 381. Upper and lower sides of the installation member 380 may be substantially symmetrical with respect to the channel 380', and the thick thickness (to) and the thin thickness (ti) may correspond to thicknesses of upper portions or lower portions of the installation member 380 based on the channel 380'. The characteristics of the first and second portions 381 and 382 are substantially the same as those described above, and thus descriptions thereof will not be repeated here.

As described above, according to at least one of the above described embodiments, the thickness or width of each insulation member is varied so as to improve insulation of the lead members while allowing for free bending of the lead members. Therefore, the secondary battery may have a compact structure, and characteristics of the secondary battery related to safety such as insulation may be improved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details may be made therein without departing from the spirit and scope as defined by the following claims.

What is claimed is:

1. A secondary battery comprising:
an electrode assembly;
a case accommodating the electrode assembly;
a lead member extending from the electrode assembly to outside of the case; and
an insulation member at least partially covering the lead member, the insulation member having an exterior portion that is located outside the case and an interior portion that is located inside the case, wherein the interior portion has a first thickness, wherein the exterior portion of the insulation member includes a first part extending outwardly from the interior portion and having the first thickness and a second part extending outwardly from the first part and having a second thickness less than the first thickness,
wherein the insulation member comprises a first portion disposed on the lead member and a second portion disposed on the first portion, wherein each of the first and second portions forms part of the interior portion and part of the exterior portion, and wherein the entirety of the second portion of the insulation member is arranged outside the electrode assembly so as to be spaced apart from the electrode assembly,
wherein each of the first and second portions has an inner end arranged inside the case, wherein the inner end of the first portion is aligned with the inner end of the second portion in a depth dimension of the case, and wherein the lead member extends inwardly to the electrode assembly beyond the inner ends of the first and second portions without being covered by an insulating layer.

2. The secondary battery of claim 1,
wherein the first portion is exposed from the second portion and forms an outer end,
wherein the second portion does not extend to the outer end of the first portion, wherein the second portion is shorter than the first portion,
wherein the first part includes part of the first portion and part of the second portion, and
wherein the second part extends from the part of the first portion.

3. The secondary battery of claim 2, wherein the second portion is thicker than the first portion.

4. The secondary battery of claim 3, wherein the second portion is wider than the first portion.

5. The secondary battery of claim 4, wherein the first portion is wider than the lead member.

6. The secondary battery of claim 2, wherein the first and second portions comprise substantially the same insulative material.

7. The secondary battery of claim 6, wherein the first and second portions are integrally formed into a single piece.

8. The secondary battery of claim 2, wherein the second portion extends at least to a terrace of the case through which the lead member extends outward.

9. The secondary battery of claim 1, wherein the interior portion has a first width, wherein at least part of the exterior portion has a second width less than the first width.

10. The secondary battery of claim 1, wherein the lead member extends to the outside of the case through a terrace of the case, and
wherein the lead member extending to the outside of the case is bent back toward the terrace.

11. The secondary battery of claim 10, further comprising a circuit board electrically connected to the lead member and placed on the terrace.

12. The secondary battery of claim 11, wherein the circuit board is disposed in parallel with the terrace.

13. The secondary battery of claim 1, wherein the case comprises a flexible pouch.

14. A secondary battery comprising:
an electrode assembly;
a case accommodating the electrode assembly;
a lead member outwardly extending from the electrode assembly to outside of the case; and
an insulation member at least partially covering the lead member and having varying thicknesses,
wherein the insulation member has an exterior portion that is located outside the case and an interior portion that is located inside the case, wherein the exterior portion of the insulation member includes a first part extending outwardly from the interior portion and having a first thickness and a second part extending outwardly from the first part and having a second thickness less than the first thickness,
wherein the insulation member comprises a first portion disposed on the lead member and a second portion disposed on the first portion, wherein each of the first and second portions forms part of the interior portion and part of the exterior portion, and wherein the entirety of the second portion of the insulation member is arranged outside the electrode assembly so as to be spaced apart from the electrode assembly wherein each of the first and second portions has an inner end arranged inside the case, wherein the inner end of the first portion is aligned with the inner end of the second portion in a depth dimension of the case, and wherein the lead member extends inwardly to the electrode assembly beyond the inner ends of the first and second portions without being covered by an insulating layer.

15. The secondary battery of claim 14, wherein the interior portion has a first width, and wherein at least part of the exterior portion has a second width less than the first width.

16. A secondary battery comprising:
an electrode assembly;
a case accommodating the electrode assembly;
a lead member outwardly extending from the electrode assembly to outside of the case; and
an insulation member at least partially covering the lead member and having a stepped structure,
wherein the insulation member has an exterior portion that is located outside the case and an interior portion that is located inside the case, wherein the exterior portion of the insulation member includes a first part extending outwardly from the interior portion and having a first thickness and a second part extending outwardly from the first part and having a second thickness less than the first thickness, wherein the insulation member comprises a first portion disposed on the lead member and a second portion disposed on the first portion, wherein each of the first and second portions forms part of the interior portion and part of the exterior portion, and wherein the entirety of the second portion of the insulation member is arranged outside the electrode assembly so as to be spaced apparat from the electrode assembly, wherein each of the first and second portions has an inner end arranged inside the case, wherein the inner end of the first portion is aligned with the inner end of the second portion in a depth dimension of the case, and wherein the lead member extends inwardly to the electrode assembly beyond the inner ends of the first and second portions without being covered by an insulating layer.

17. The secondary battery of claim 11, wherein the circuit board is arranged between the lead member and the terrace of the case.

18. The secondary battery of claim 1, wherein the first portion is longer than the second portion.

19. The secondary battery of claim 1, wherein no part of the second portion of the insulation member extends to and is in direct physical contact with the electrode assembly.

* * * * *